United States Patent Office 3,701,770
Patented Oct. 31, 1972

3,701,770
9,11-CYCLIC BORONATE ESTERS OF THE 6,9-HEMIKETAL OF ERYTHROMYCIN A
Peter Hadley Jones, Lake Forest, and Kishori S. Iyer, Waukegan, Ill., assignors to Abbott Laboratories, North Chicago, Ill.
No Drawing. Filed Feb. 1, 1971, Ser. No. 111,733
Int. Cl. C07c 47/18
U.S. Cl. 260—210 E                    10 Claims

ABSTRACT OF THE DISCLOSURE

The 9,11-phenyl; halo, nitro, and lower alkyl substituted phenyl; lower alkyl; fatty alkyl; and cyclyohexyl cyclic boronate ester of the 6,9-hemiketal of erythromycin A have useful antibiotic activity.

DISCLOSURE OF THE INVENTION

This invention relates to boronate esters of erythromycin A having antibiotic activity. More particularly, this invention relates to boronate esters of erythromycin A which are esterified at the 9- and 11-positions of the erythronolide ring. The invention includes compounds having the structure

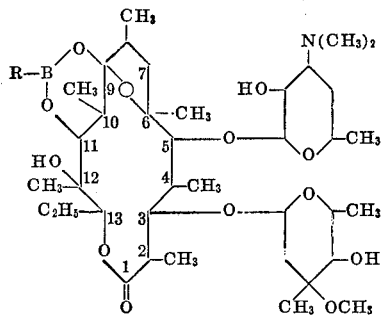

wherein R is phenyl; halo, e.g., chloro, bromo, and iodo, nitro lower alkyl (i.e. $C_1$ to $C_4$) substituted phenyl; lower alkyl; fatty alkyl groups such as $C_{14}H_{29}$; $C_{16}H_{33}$; $C_{18}H_{37}$; and $C_{20}H_{41}$; and cyclohexyl.

The compounds of this invention are prepared by refluxing a substituted boronic acid of the formula

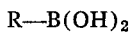

$$R—B(OH)_2$$

or ethylene glycol ester of substituted boronic acid of the formula

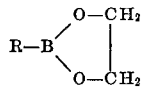

wherein R has the same meaning as set forth above, with erythromycin A in the presence of a strong base such as for example, alkali hydroxide or alkali carbonate.

The reaction is preferably carried out under anhydrous conditions in a non-polar solvent such as benzene. The temperature of reaction is not critical and the reaction can be carried out with good yield at a temperature range of from 20° C. to the reflux temperautre of the reaction mixtures. However, at lower temperatures the reaction is slower and if the reaction time is unduly prolonged, there is the opportunity for the formation of undesired product. Since water is formed during the course of the reaction, it is preferable to provide some means such as standard water trap to remove whatever water results from the reaction. The reaction is a straight forward addition reaction and theoretically a 1:1 molar ratio of ethylene glycol substituted boronate and erythromycin A can result in a complete reaction, yet in order to obtain maximum yield, it has been found that an excess of boronate ester is desirable. The reaction under reflux conditions is complete in from 1 to 10 hours and after the reaction has been completed, the reaction mixture is dried, the solvent being removed in vacuo, the product can be recrystallized from a stable non-polar solvent such as diethyl ether.

The invention will be further illustrated by reference to the following examples.

Example 1.—Erythromycin A—9,11 phenyl boronate-6,9-hemiketal using ethylene glycol phenyl boronate A solution of ethylene glycol phenyl boronate (10.0 g., 0.07 mole) in 50 ml. of benzene was added to a refluxing solution of benzene containing 10.0 g. (0.014 mole) of erythromycin A and 5.0 g. of anhydrous potassium carbonate. The mixture was refluxed for 2 hours removing the water formed with a water trap. The cooled benzene solution was decanted into a separatory funnel. The residual potassium carbonate slurry was dissolved in warm water and the resulting solution was added to the separatory funnel. The aqueous layer was discarded and the benzene layer washed three times with 3% sodium chloride solution. After drying over sodium sulfate, the benzene was removed in vacuo to yield the boronate ester as a glass. After crystallization from ether, 4.6 g. of product was collected, M.P. 166–168°.

*Analysis.*—Calculated for $C_{43}H_{70}BNO_{13}$ (percent): C, 62.99; H, 8.60; N, 1.70. Found (percent): C, 63.20; H, 8.56; N, 1.57.

Example 2.—Erythromycin A—9,11-phenylboronate-6,9-hemiketal using phenyl boronic acid In a manner analogous to that described in Example 1, the compound of this example was prepared from 10.0 g., 0.082 mole of phenyl boronic acid and 11.0 g., or 0.015 mole of erythromycin A. The product was recrystallized from ether yielding 5.6 g. of product having a melting point of 166–168° C.

In a manner analogous to the method described in Examples 1 and 2 insofar as reaction conditions, i.e., time and temperature of reaction, the compounds set forth in the table below were prepared. Variations in identity and quality of starting materials are indicated in the columns headed "Description of Starting Material."

| Ex. | R | Compound prepared | Description of starting material | | Product | | |
|---|---|---|---|---|---|---|---|
| | | | Erythromycin A, moles | Boron compound | Recrystallization from— | Yield, g. | M.P.,°C. |
| 3 | n-Butyl | Erythromycin A 9, 11-n-butylboronate-6, 9-hemiketal. | 0.007 | 0.05 mole n-butylboronic acid. | Acetone-water | 3.5 | 80–84 |
| 4 | do | do | 0.0035 | .007 mole ethylene glycol n-butylboronate. | do | | 81–85 |
| 5 | p-Bromophenyl | Erythromycin A 9, 11-(p-bromophenyl) boronate-6, 9-hemiketal. | 0.0027 | 0.012 mole p-bromophenylboronic acid. | Methylene chloride-hexane. | 1.8 | 239–241 |
| 6 | p-Tolyl | Erythromycin A 9, 11-(p-tolyl) boronate-6, 9-hemiketal. | 0.0027 | 0.013 mole p-tolylboronic acid. | Ether | 1.2 | 186–188 |
| 7 | Cyclohexyl | Erythromycin A 9, 11-cyclohexylboronate-6, 9-hemiketal. | 0.0068 | 0.035 mole cyclohexylboronic acid. | | 4.2 | |
| 8 | m-Nitrophenyl | Erythromycin A 9, 11-(m-nitrophenyl)-boronate-6, 9-hemiketal. | 0.0068 | 0.3 mole m-nitrophenylboronic acid. | | | |
| 9 | Octadecyl | Erythromycin A 9, 11-octadecyl boronate 6, 9-hemiketal. | 0.0068 | 0.035 mole octadecyl boronic acid. | | | |

Likewise, derivatives can be prepared using R substituted boronic acid where R is dodecyl; tetradecyl; hexadecyl; o-nitrophenyl, p-nitrophenyl; p-chlorophenyl; o-chlorophenyl; m-chlorophenyl; o-bromophenyl; m-bromophenyl; methyl, ethyl, propyl and butyl substituted phenyl; methyl, ethyl, and propyl.

The organisms susceptible to the compounds of this invention in general include those organisms which are susceptible to erythromycin A. This spectrum of activity does not, however, have the same intensity of activity as exhibited by erythromycin A. The minimum inhibitory concentration, that is the minimum concentration of antibiotic expressed in micrograms per milliliter that succeeds in inhibiting the growth of the organism on an agar plate, of illustrative compounds of this invention against various organisms is set forth in the following table.

MINIMUM INHIBITORY CONCENTRATION
(mcg./ml.)

| Organism R | Phenyl | n-Butyl | p-Bromophenyl | Cyclohexyl |
|---|---|---|---|---|
| Staphylococcus aureus (9144) | 0.39 | 0.39 | 0.78 | .39 |
| Staphylococcus aureus (Smith) | 0.39 | 0.39 | 0.78 | .39 |
| Staphylococcus faecalis ATCC10541 | 0.10 | 0.10 | 0.10 | 0.10 |
| Klebsiella pneumoniae (10031) | 6.2 | 3.1 | 6.2 | 6.2 |

In general, the compounds of this invention can be used as a swab or soak solution to inhibit the growth of susceptible organisms on various surfaces such for example as medical or dental equipment or laboratory equipment such as bench tops and the like. The swab solution can comprise an aqueous solution of a compound of this invention or an acid addition salt thereof, e.g., the hydrochloride sulfate, stearate, lauryl sulfate, citrate, etc., a concentration at least equivalent to its minimum inhibitory concentration and preferably at a concentration of about 200 to 300 mcg./ml.

We claim:
1. A compound of the formula

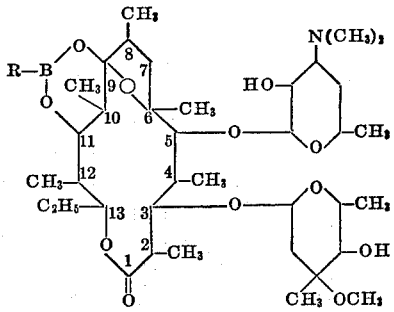

where R is phenyl, halo, nitro and lower alkyl substituted phenyl, lower alkyl, fatty alkyl $C_{14+2n}H_{29+4n}$ where $n$ is an integer from 0 to 3 inclusive, and cyclohexyl.

2. A compound according to claim 1 in which R is phenyl, lower alkyl, and cyclohexyl.

3. A compound according to claim 1 in which R is halophenyl.

4. A compound according to claim 1 in which R is bromophenyl.

5. A compound according to claim 1 in which R is phenyl.

6. A compound according to claim 1 in which R is cyclohexyl.

7. A compound according to claim 1 in which R is nitrophenyl.

8. A compound according to claim 1 in which R is butyl.

9. A compound according to claim 1 in which R is tolyl.

10. A compound according to claim 1 in which R is octadecyl.

References Cited

UNITED STATES PATENTS 3,417,077   12/1968   Murphy et al. _____ 260—210 E

LEWIS GOTTS, Primary Examiner

J. R. BROWN, Assistant Examiner

U.S. Cl. X.R.
424—180